July 17, 1934.  C. D. CUTTING  1,966,486
UNIVERSAL JOINT
Filed Nov. 13, 1933  2 Sheets-Sheet 1
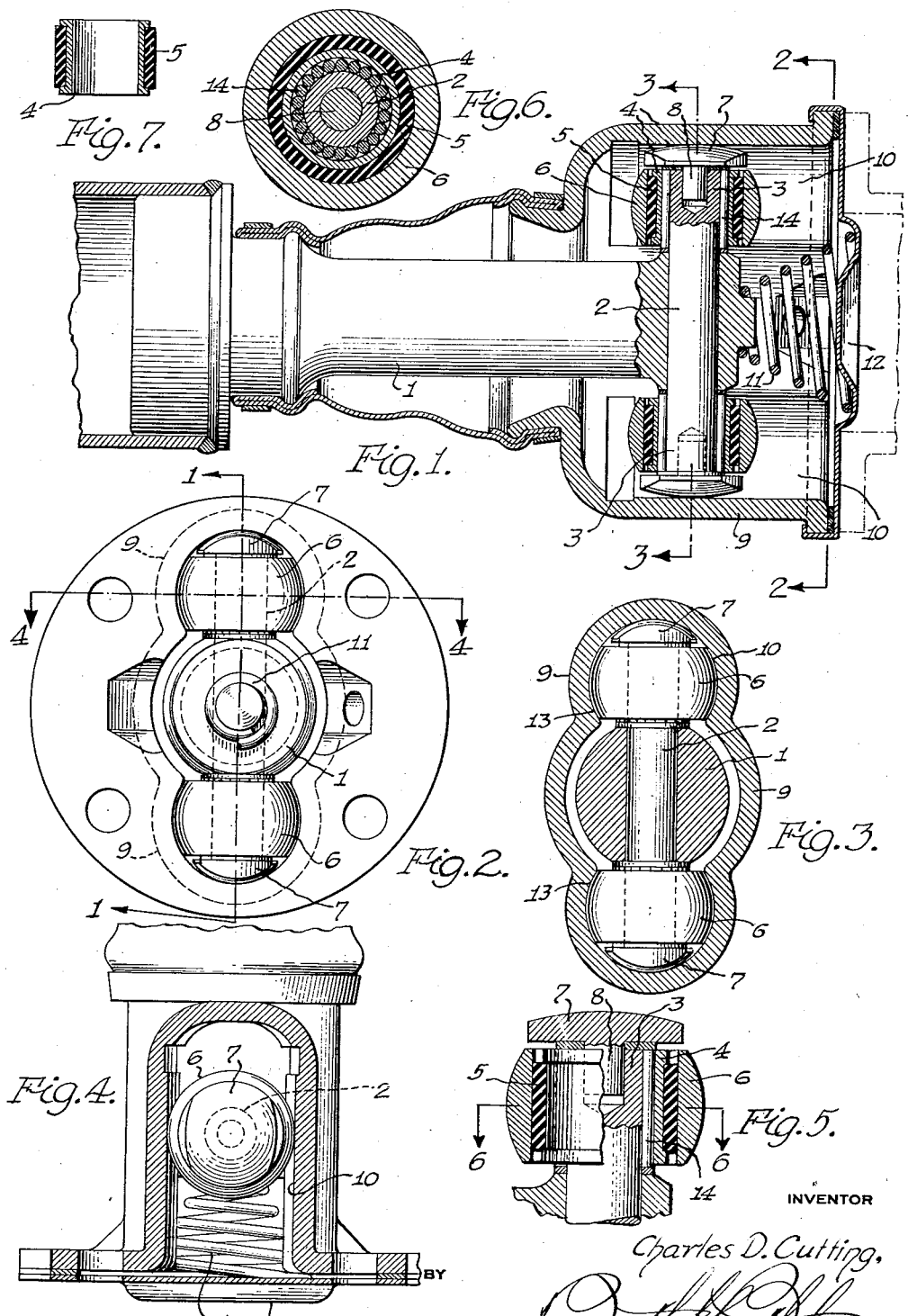

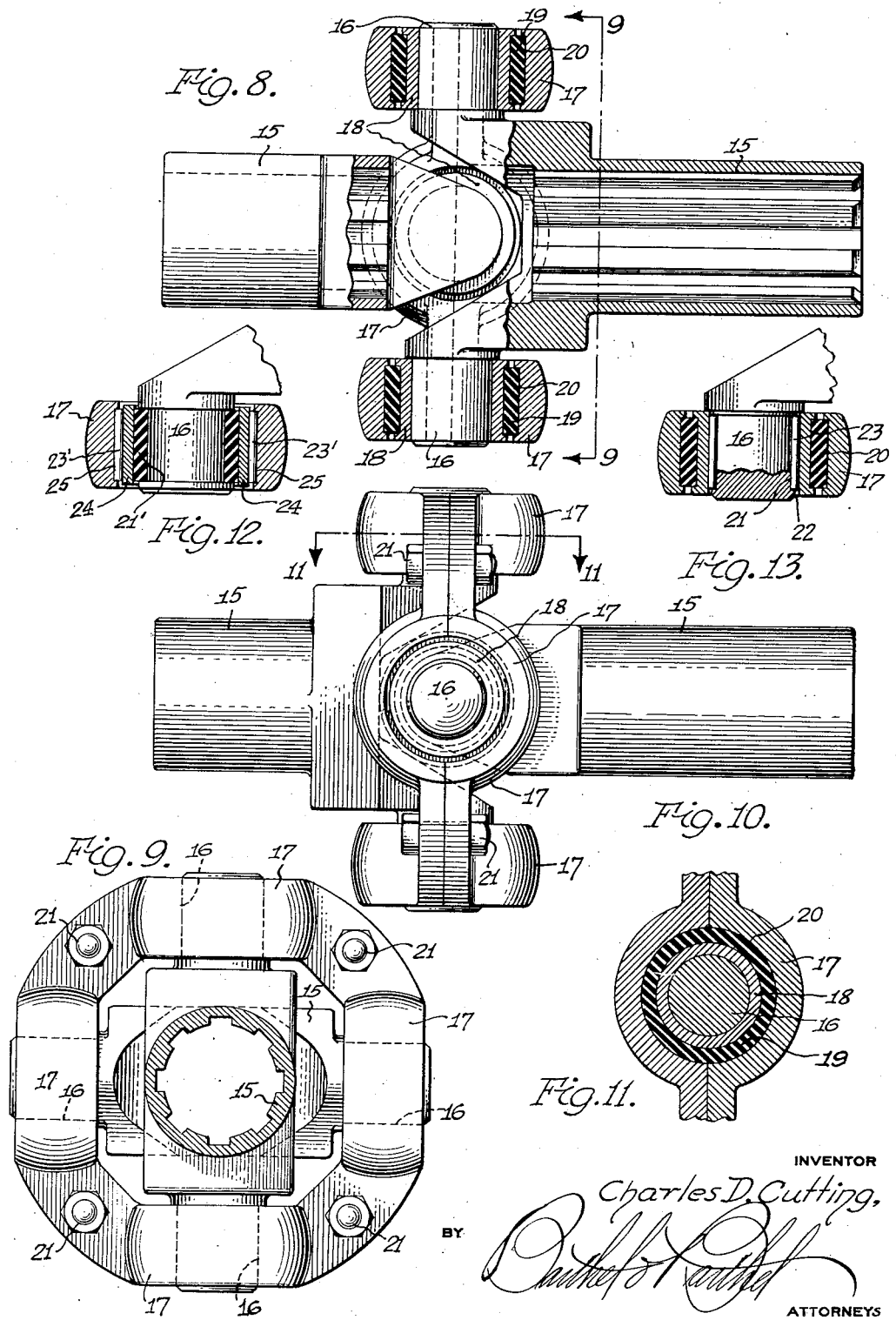

Patented July 17, 1934

1,966,486

UNITED STATES PATENT OFFICE 1,966,486

UNIVERSAL JOINT

Charles D. Cutting, Detroit, Mich., assignor to Charles D. Cutting, Inc., Detroit, Mich., a corporation of Michigan Application November 13, 1933, Serial No. 697,716

12 Claims. (Cl. 64—102)

This invention relates to universal joints and is a continuation in part of my copending application Serial No. 684,352, filed August 4, 1933.

In the above mentioned application is revealed and described an elastic cushioning element between each trunnion and its retaining member either internally or externally of the usual bushing, the bushing itself constituting a bearing member so that the rubber is used only in compression.

It is an object of the present invention to teach other and further ways of installing such a cushioning element in other and different types of universal joints.

It is a specific object to teach the installation of such elements in the so-called ring type joints wherein the ends of the trunnions are exposed. It is essential to this invention that the cushioning elements be simply cushioning elements as opposed to torsional resistant elements. The problem of securing these elements in place therefore becomes important and it is an object of this invention to teach how to properly install these elements.

It is a specific object of this invention to teach an improved manner of retaining the cushioning elements in place in such way that an amount of axial movement of the trunnions may occur without displacement of the cushioning elements.

In inserting cushioning elements as herein described it is highly desirable that the size of the joint be not unduly increased. Some increase in size is, of course, essential and if needle bearings are employed according to conventional installation the total over all dimensions are so great as to be objectionable. It is therefore a further object to teach an improved method of installing the needle bearings also, in order that they may be usable in the same joint with the elastic cushions.

With the above and other ends in view the invention consists in matters hereinafter set forth and more particularly pointed out in the appended claims, reference being had to the accompanying drawings, in which Figure 1 is a longitudinal section through the so-called single pin type joint showing my invention applied thereto, taken along the line 1—1 of Figure 2;

Fig. 2 is an end view of the joint illustrated in Fig. 1;

Fig. 3 is a transverse section taken along the line 3—3 of Fig. 1;

Fig. 4 is a transverse section taken along the line 4—4 of Fig. 2;

Fig. 5 is an enlarged view of one of the trunnion assemblies shown in Fig. 1;

Fig. 6 is a transverse section taken along the line 6—6 of Fig. 5;

Fig. 7 is a view of a bushing and cushion constructed in accord with this invention;

Fig. 8 is a view of a so-called ring type joint partially in section to illustrate the invention;

Fig. 9 is a transverse or side view of the joint of Fig. 8, taken along the line 9—9 of Fig. 8;

Fig. 10 is a plan view of the complete joint;

Fig. 11 is a section taken along the line 11—11 of Fig. 10;

Fig. 12 is a section of a trunnion assembly showing an improved construction including needle bearings;

Fig. 13 is a section of a trunnion assembly showing a modification of the assembly of Fig. 12.

More particularly, 1 refers to a shaft having a pin 2 inserted therethrough. The ends of this pin constitute trunnions 3 each having a bushing 4 freely rotatable thereon. The outer wall of the bushings are inset for a sufficient channel width to receive and retain an elastic ring 5 of suitable material such as rubber which is given a close fit therewith. Over each ring a spherical bushing transmission member 6 is forced. A pin thrust cap 7 of spherical conformation has a shank 8 for reception in an opening in each end of the pin 2 to complete the trunnion assembly. The outer main member 9 is made as illustrated in Figs. 1 and 3 with two cylindrical bores 10 each having a radius substantially equal to that of the bushing 6 and the thrust cap 7. A spring 11 reacts at one end against the end of the shaft 1 and at its other end against a cover plate 12. It is known that this type joint does not drive through the entire spherical surface of the ball bushing 6 but that there is brinelling in the region indicated at 13 (Fig. 3). For this reason it is generally considered that such a joint is for only comparatively light duty. The rubber ring 5 has been found excellent for overcoming this brinelling at 13 probably because it permits just enough rolling of the bushing 6 for it to find a more complete contact with the cylinder 10. Due to the slight rolling of the bushing 6 it can also be seen that the loading on the needle bearings 14 is more uniformly distributed. This ring 5 is preferably made of a rubber of substantial hardness, say 80° to 100° durometer test, and firmly assembled as above indicated.

In Figs. 8 to 11 a ring type joint is illustrated wherein two main members 15 each carrying a pair of trunnions 16 are connected by a split ring transmission member 17, this ring being provided at intervals with radial apertures to receive the trunnions 16. A bushing 18 freely surrounds each trunnion 16 and is provided with a channel in the outer wall thereof having a width sufficient to receive and retain a rubber ring 19. The walls of each aperture are also preferably provided with similar channels 20 to receive the rubber rings 19. The rings are preferably slightly oversized so that when the split ring 17 is assembled therewith considerable pressure is necessary to draw the two parts together by the screws 21. The trunnions are open or exposed at their outer ends and the ring is capable of a consequent slight movement radially of each pair of trunnions. However this slight movement cannot become a noisy hammering action because any undue tendency of this kind may be resisted by the rubber in shear and because the rubber completely insulates each member 15 from metal to metal contact with the ring and with each other. In assembly, the rubber rings 19 are preferably of such size as to require a slight stretching in placement over the bushings 18. The rings and bushings are thereupon placed on their respective trunnions and the split ring 17 assembled therearound. The bushing 18 and ring 19 are substantially identical for the two joints herein illustrated.

For manufacturing reasons it is highly desirable that the diameter of the ring apertures be not materially increased. For certain uses, needle bearings have been found desirable but without special design the use of the needle bearings and the rubber rings loses some attractiveness because of the increase in diameter of this aperture. I have found that by using needle bearings it is possible to maintain the original trunnion strength with a slightly less trunnion diameter. I therefore propose to take advantage of this by providing an inset portion 21 (Fig. 13) in each trunnion, leaving a retaining end wall 22 integral with the trunnion. This inset may be of approximately half the depth of the diameter of the needles 23. The needles may then be assembled about the trunnion, the ring 19 and bushing 18 inserted thereover and the split ring 17 assembled therearound.

In Fig. 12 the construction is reversed to the extent that the rubber ring is placed in the trunnion inset 21', and the bushing 24 fits closely around the rubber. The bushing 24 has plain cylindrical inner walls. Needle bearings 23' are inserted between the bushing and the ring member and either the exterior wall of the bushing or the interior wall of the ring aperture may be inset for this purpose. As shown the ring wall is inset at 25.

Certain features revealed herein including the imposition of continuous pressure on the rubber and the insetting of the rubber rings in the bushings as well as the insetting of the trunnions to receive either the needle bearings or the rings will find individual adaptability to various other type joints, and I therefore desire to be limited in protection only by the scope of the appended claims.

What I claim is:—

1. In a universal joint wherein pairs of trunnions of opposed members are arranged in regular alternation, a housing divided to permit insertion of the trunnions with each housing portion carrying walled openings corresponding to the locations of assembled trunnions, a journal for each trunnion, an elastic member for and individual to each journal, said journals extending into corresponding walled openings in the housings.

2. In a universal joint, two main members, freely oscillable trunnions associated with said main members, a bushing comprising a plain bearing member for each of said trunnions, and a rubber ring individual to and encircling each of said trunnions and associated with the bearing member thereof, said bearing members each having a channel of sufficient width to receive and maintain the rubber ring associated therewith against displacement after assembly.

3. In a universal joint, two main members, trunnions associated with said main members, a bushing constituting a plain bearing member for each of said trunnions, and a rubber ring individual to and encircling each of said trunnions and its bearing member, each of said plain bearing members having an inset portion in the outer wall thereof of sufficient width to receive and maintain said ring against displacement after assembly.

4. In a universal joint, two main members, trunnions associated with said main members, a bushing constituting a plain bearing member for each of said trunnions, a rubber ring individual to and encircling each of said trunnions and its bearing member, each of said plain bearing members having an inset portion in the outer wall thereof of sufficient width to receive and maintain said ring against displacement after assembly, and means for maintaining each of said rubber rings under a continuous and substantial pressure against their respective bushings.

5. In a universal joint, two main members having trunnions associated therewith, a transmission member for receiving said trunnions in freely journalled relation, and a resilient means individual to each trunnion for cushioning rotational thrust of said trunnions with respect to said transmission member, said cushioning elements finding a grooved seat between said trunnions and said transmission member constituting a positive retaining means against loss or displacement during operation.

6. In a universal joint, trunnions having bushings therearound, a transmission member for receiving said bushings and said trunnions, said trunnions being freely oscillable with respect to said transmission member, and a resilient cushioning element individual to each of said trunnions between each of said bushings and said transmission member, said cushioning element finding a grooved seat in at least one of the members with which it contacts constituting a retaining means against loss or displacement.

7. In a universal joint, trunnions having bushings therearound, a transmission member for receiving said bushings and said trunnions, said trunnions being freely oscillable with respect to said transmission member, and a resilient cushioning element individual to each of said trunnions and residing between each of said bushings and said transmission member, said cushioning element finding a grooved seat in at least one of the members with which it contacts constituting a retaining means against loss or displacement, said cushioning element being assembled in said seat under initial compression.

8. In a universal joint wherein pairs of trunnions of opposed members are arranged in regular alternation, a housing divided to permit insertion of the trunnions with each housing portion carrying walled openings corresponding to the locations of assembled trunnions, a journal for each trunnion, an elastic member for and individual to each journal, said journals extending into corresponding walled openings in the housings, said walled openings and journals each having recessed portions to receive elastic members to restrain relative movement axially of the member relative to said walled openings and said journals.

9. In a universal joint, two main members each carrying trunnions, a split ring transmission member housing said trunnions in freely journalled relation, a bushing between each of said trunnions and said ring member, and an elastic cushioning element individual to each trunnion and residing between each of said bushings and said ring member, said ring member upon assembly about said trunnions imposing a substantial compression on said cushioning elements.

10. In a universal joint, two main members having trunnions associated therewith, a bushing for each of said trunnions, needle bearings between each of said trunnions and its bushing finding an inset seating portion therebetween, the outer wall of the inset constituting means for retaining said needle bearings against axial displacement, and an elastic ring between each of said bushings and its transmission member finding an inset seating portion therebetween, the outer wall of said inset constituting means for retaining said needle bearings against displacement.

11. In a universal joint, two main members each carrying trunnions, a transmission member for receiving said trunnions, needle bearings for each of said trunnions, said trunnions each having an inset of a depth less than the diameter of said needles and a width at least as great as the length of said needles, bushings fitting closely about said needle bearings, said bushings each having an inset in the outer surface thereof, and an elastic cushioning element retained against axial displacement by the end walls of the inset in said bushings for transmitting rotational and longitudinal thrust to said transmission member.

12. In a universal joint, a shaft having two trunnions thereon, a bushing freely rotatable on each of said trunnions, a spherical bearing transmission member encircling each of said bushings, a main transmission member for rotatably and slidably receiving said bearing transmission members, and an elastic cushioning element between each of said bushings and its spherical bearing transmission member.

CHARLES D. CUTTING.